(12) United States Patent
York

(10) Patent No.: US 8,762,943 B1
(45) Date of Patent: Jun. 24, 2014

(54) RUNTIME COMPONENT HOSTING

(75) Inventor: Bill York, Hopedale, MA (US)

(73) Assignee: The MathWorks, Inc., Natick, MA (US)

( * ) Notice: Subject to any disclaimer, the term of this patent is extended or adjusted under 35 U.S.C. 154(b) by 415 days.

(21) Appl. No.: 12/777,655

(22) Filed: May 11, 2010

Related U.S. Application Data

(63) Continuation of application No. 10/945,823, filed on Sep. 20, 2004.

(51) Int. Cl.
*G06F 9/44* (2006.01)

(52) U.S. Cl.
USPC .......................................... 717/120; 717/123

(58) Field of Classification Search
None
See application file for complete search history.

(56) References Cited

U.S. PATENT DOCUMENTS

| | | | |
|---|---|---|---|
| 5,544,300 A * | 8/1996 | Skarbo et al. | 715/759 |
| 5,613,058 A * | 3/1997 | Koppolu et al. | 715/744 |
| 6,054,985 A | 4/2000 | Morgan et al. | |
| 6,229,537 B1 | 5/2001 | Sobeski et al. | |
| 6,266,058 B1 * | 7/2001 | Meyer | 715/733 |
| 6,522,343 B2 | 2/2003 | Sobeski et al. | |
| 6,625,803 B1 | 9/2003 | Massena et al. | |
| 6,871,348 B1 * | 3/2005 | Cooper | 719/310 |
| 6,918,125 B1 | 7/2005 | Skinner et al. | |
| 7,093,267 B2 | 8/2006 | Beaumont et al. | |
| 2002/0066084 A1 | 5/2002 | Sobeski et al. | |
| 2003/0048286 A1 * | 3/2003 | Lal | 345/700 |
| 2004/0093587 A1 | 5/2004 | Sesma | |
| 2004/0163087 A1 * | 8/2004 | Sandland et al. | 719/310 |

\* cited by examiner

*Primary Examiner* — Wei Zhen
*Assistant Examiner* — Matthew Brophy
(74) *Attorney, Agent, or Firm* — Cesari and McKenna, LLP; Michael R. Reinemann

(57) ABSTRACT

A method and apparatus for enabling interactive programming and/or development environments with the ability to dynamically host ActiveX controls and Java components simultaneously in the same figure window is provided. This type of hosting ActiveX controls is different from the industry standard in that the ActiveX control can be chosen dynamically at runtime. A Java container is disposed in a Java-based operating system window. A plurality of Java canvases are configured in the figure window, such that each Java canvas is supported by the Java container. A plurality of components are positioned on the plurality of Java canvases. Each of the plurality of components can be dynamically added and removed from the plurality of Java canvases without re-creation of the operating system window. Furthermore, at least one of the components does not contain a Java class or a Java interface.

15 Claims, 6 Drawing Sheets

RUNTIME COMPONENT HOSTING

RELATED APPLICATIONS

The present application is a continuation application of U.S. application Ser. No. 10/945,823, filed Sep. 20, 2004, entitled "Runtime Component Hosting," the contents of which are incorporated herein.

FIELD OF THE INVENTION

The present invention relates to a system and method suitable for hosting a plurality of Java components, and more particularly to a method of dynamically hosting both an ActiveX® control and a Java® component in a common window.

BACKGROUND OF THE INVENTION

MATLAB®, provided by The MathWorks, Inc. of Natick, Mass. is an interactive programming and development application that can implement a variety of computing tasks in engineering and science. MATLAB has the ability to execute other executable programs. Some of the tasks that MATLAB can perform range from data acquisition and analysis to application development. The MATLAB environment integrates mathematical computing, visualization, and technical programming language. MATLAB includes built-in interfaces that provide access to and import data from instruments, files, and external databases and programs.

In addition, MATLAB can integrate external routines written in C, C++, Fortran, and Java with MATLAB applications. As such, MATLAB provides an example of an interactive programming and/or development environment that can work in conjunction with routines provided external to MATLAB, including those provided by third party providers. Users of MATLAB, and similar programs, often have the need to communicate with other software or hardware components using programs like MATLAB.

As a part of the interactive environment, MATLAB enables the creation of graphics that are displayed in operating system windows. The operating system windows are known as "figure windows". The figure windows that present the graphics often also include some form of user interface control that enables a user to provide some form of input or instruction to the interactive environment. Controls are generally objects in a window that can be individually selected and manipulated. Examples of controls include pull down menus, scroll bars, push buttons, slide buttons, dials, and the like.

Microsoft Windows® provides frameworks creating user interface controls known as ActiveX. ActiveX controls are a special variety of controls that support COM (component object model). MATLAB provides a bridge for hosting ActiveX controls and .NET controls in figure windows.

Sun Microsystems provides a Java Component API for creating Java components. MATLAB provides an API for creating Java components and a bridge for hosting such Java components in figure windows.

MATLAB and other interactive development environments, however, do not support dynamic hosting of both ActiveX controls and Java components.

SUMMARY OF THE INVENTION

There is a need for an interactive programming and/or development environment that can dynamically host ActiveX controls and Java components in a same operating system window. The present invention is directed toward further solutions to address this need.

An operating system window, as utilized herein refers to an enclosed, typically rectangular, area displayed on a screen to the user. The operating systems have graphical user interfaces (GUIs) that enable a user to divide the screen they are viewing into multiple windows. Each window displayed can run or otherwise operate a separate program, application, or display. As utilized herein, the phrase "operating system window" and the phrase "figure window" are interchangeable.

Furthermore, as utilized herein, a Java-based operating system window can be implemented as a high level operating system window having a Java container substantially matching the dimensions of the operating system window. Thus, anything in the operating system window must be placed on the space occupied by the Java container. A Java container is a term indicating a graphical element that has subcomponents. Example containers, in a generic sense, include windows, panels, frames, and dialog boxes. A component is any number of different items that can be placed in a figure window, such as controls, menus, lists, displays, and the like. A component can belong to at most one container at a time, i.e., a component cannot exist on two different containers at the same time, but can be moved from one to the other.

In addition, a Java canvas is instantiable from a Java Canvas class. A Java canvas represents a blank rectangular area of the screen onto which an application can draw or from which an application can trap input events from the user.

In accordance with one embodiment of the present invention, in an electronic device, a method of dynamically hosting a plurality of components in a Java-based operating system window includes providing the Java-based window. Dynamic hosting indicates the ability to choose and interchange components at runtime. A Java container is provided in the Java-based operating system window. A plurality of Java canvases are configured in the Java-based operating system window, such that each Java canvas is supported by the Java container. At least one of the plurality of components is positioned on at least one of the plurality of Java canvases. Each of the plurality of components can be dynamically added and removed from the plurality of Java canvases without recreation of the Java-based operating system window. At least one of the components does not contain a Java class or a Java interface.

In accordance with aspects of the present invention, at least one of the components includes a Java control. At least one of the components comprises a non-Java-based control, such as an ActiveX control. At least one of the non-Java-based components is supported by one of the plurality of Java canvases. The Java canvases accordingly bind to the Java container.

In accordance with further aspects of the present invention, the plurality of components includes at least one graphical representation. A user can define the at least one graphical representation. The user can modify the at least one graphical representation while the system window is operating. The system and method can further provide an integrated development environment hosting the Java-based operating system window. The components can be updated using conventional click access.

In accordance with one embodiment of the present invention, in an electronic device, a Java-based operating system window includes a Java container disposed in the Java-based operating system window. A plurality of Java canvases are configured in the Java-based window, such that each Java canvas is supported by the Java container. A plurality of components are positioned on the plurality of Java canvases. Each of the plurality of components can be dynamically added and removed from the plurality of Java canvases without recreation of the Java-based operating system window. Furthermore, at least one of the components does not contain a Java class or a Java interface.

In accordance with aspects of the present invention, at least one of the components includes a Java control. At least one of the components includes an ActiveX control. At least one of the components includes a non-Java-based control. At least one of the non-Java-based components is supported by one of the plurality of Java canvases.

The plurality of components can include at least one graphical representation. The at least one graphical representation is user definable and modifiable while the system window is operating.

In accordance with one embodiment of the present invention, a medium for use in an integrated development environment on an electronic device is provided. The medium holds instructions executable using the electronic device for performing a method of dynamically hosting a plurality of components in a Java-based operating system window. The method includes providing the Java-based window. A Java container is provided in the Java-based operating system window. A plurality of Java canvases are configured in the Java-based operating system window, such that each Java canvas is supported by the Java container. At least one of the plurality of components is positioned on the plurality of Java canvases. The at least one of the plurality of components can be dynamically added and removed from the plurality of Java canvases without recreation of the Java-based operating system window. The at least one of the plurality of components does not contain a Java class or a Java interface.

In accordance with one embodiment of the present invention, in an electronic device, a method of an integrated development environment dynamically hosting a plurality of components in a Java-based operating system window includes providing the Java-based window. A Java container is provided in the Java-based operating system window. A plurality of Java canvases are configured in the Java-based operating system window, such that each Java canvas is supported by the Java container. At least one of the plurality of components is placed on the plurality of Java canvases. Each of the plurality of components placed on the plurality of Java canvases can be dynamically added and removed from the plurality of Java canvases without recreation of the Java-based operating system window and does not contain a Java class or a Java interface.

In accordance with one embodiment of the present invention, in an electronic device, an integrated development environment dynamically hosting a Java-based operating system window includes a Java container disposed in the Java-based operating system window. A plurality of Java canvases are configured in the Java-based window, such that each Java canvas is supported by the Java container. At least one of a plurality of components is positioned on the plurality of Java canvases. Each of the plurality of components on the plurality of Java canvases can be dynamically added and removed from the plurality of Java canvases without recreation of the Java-based operating system window. At least one of the components does not contain a Java class or a Java interface.

In accordance with one embodiment of the present invention, in an electronic device, a method of dynamically hosting a plurality of components in an operating system window includes providing the operating system window. A Java component is dynamically hosted in the operating system window, and an ActiveX control is dynamically hosted in the operating system window.

BRIEF DESCRIPTION OF THE DRAWINGS

The present invention will become better understood with reference to the following description and accompanying drawings, wherein.

DETAILED DESCRIPTION

An illustrative embodiment of the present invention relates to enabling interactive programming and/or development environments with the ability to dynamically host ActiveX controls and Java components simultaneously in the same figure window. This type of hosting ActiveX controls is different from the industry standard in that the ActiveX control can be chosen dynamically at runtime. Sun Microsystems provides a Java component API. MATLAB provides an API for creating Java components and a bridge for hosting them in the figure window. Similar to the ActiveX control hosting, the Java component can be chosen at runtime.

Figure 1:
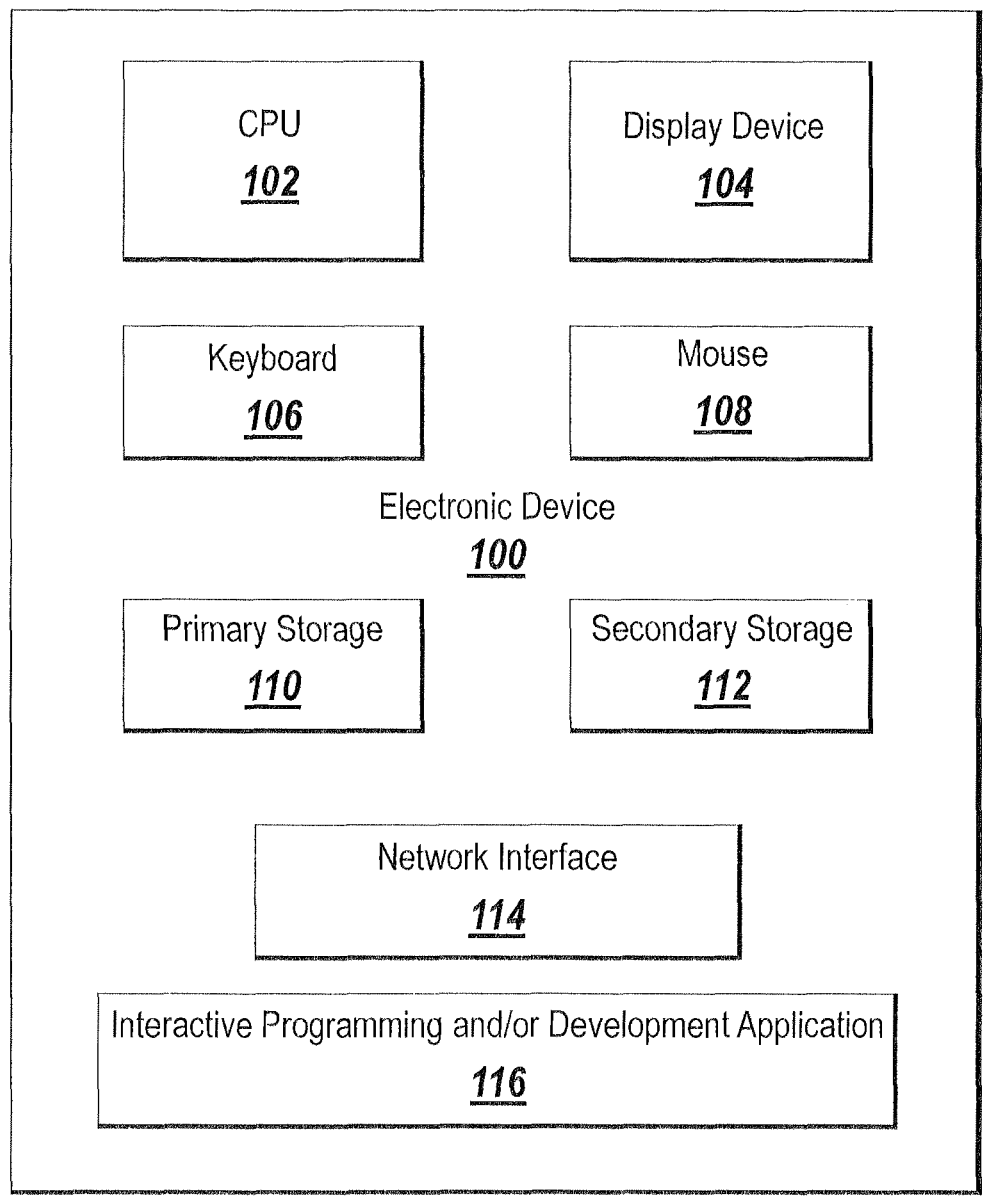
FIG. 1 is a diagrammatic illustration of an electronic device suitable for use in an implementation of the present invention.
Figure 2:
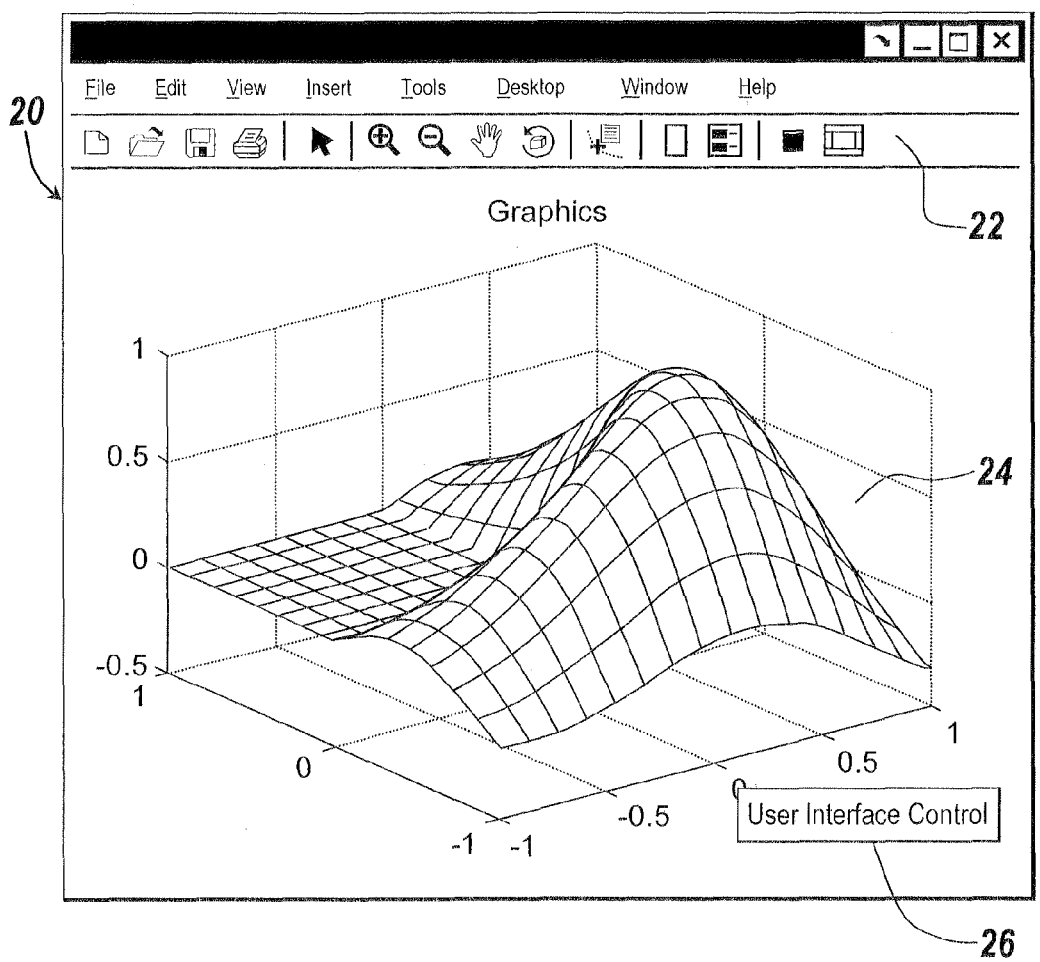
FIG. 2 is a screen depiction of an operating system window having a control component, according to conventional systems.
Figure 3:
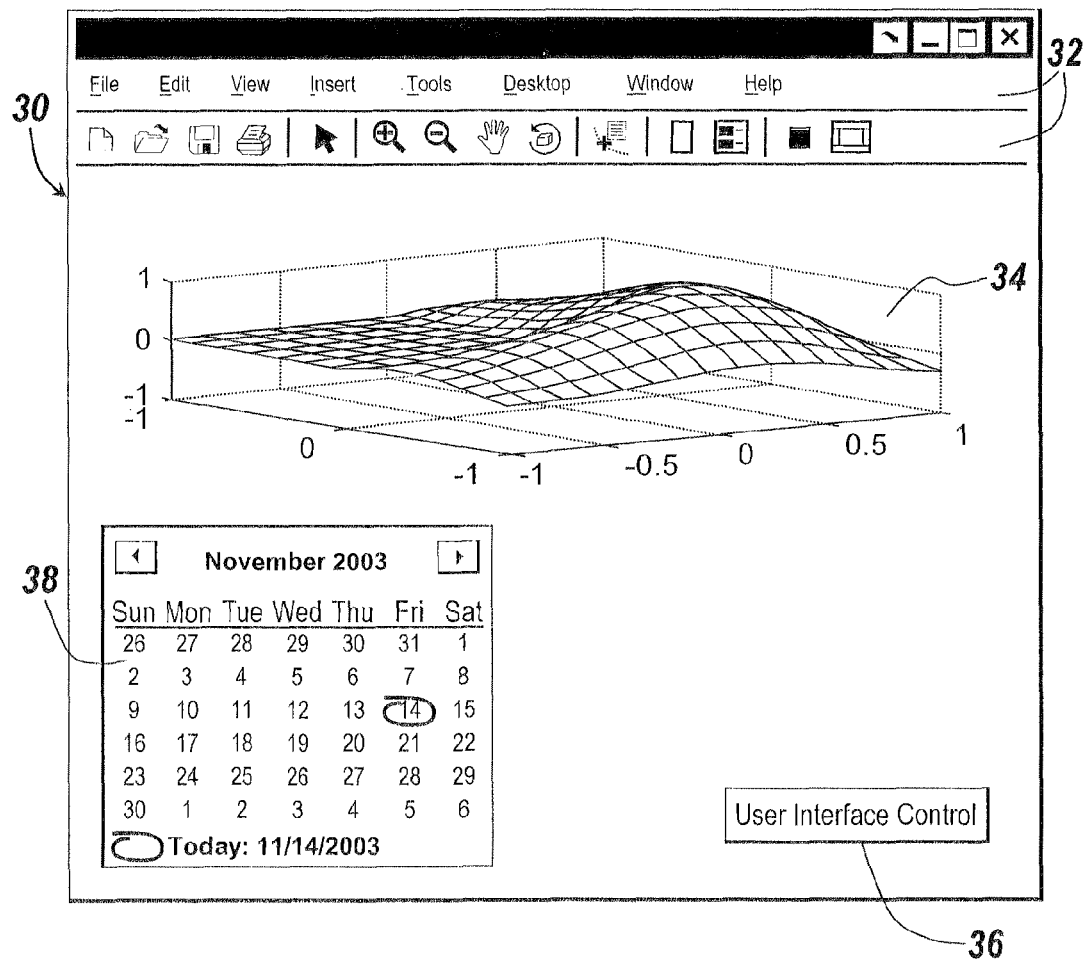
FIG. 3 is a screen depiction of an operating system window having an ActiveX control, according to conventional systems.
Figure 4:
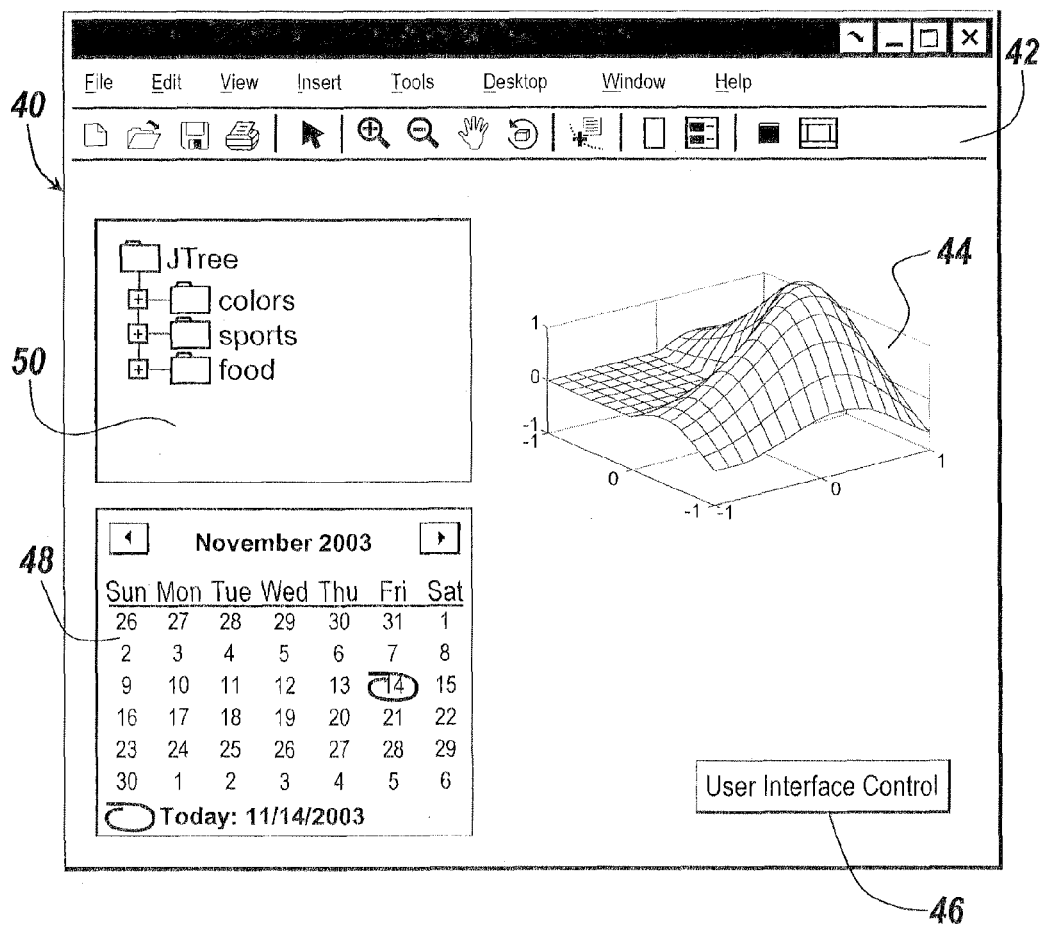
FIG. 4 is a screen depiction of an operating system window having an ActiveX control and a Java component, according to one aspect of the present invention.
Figure 5:
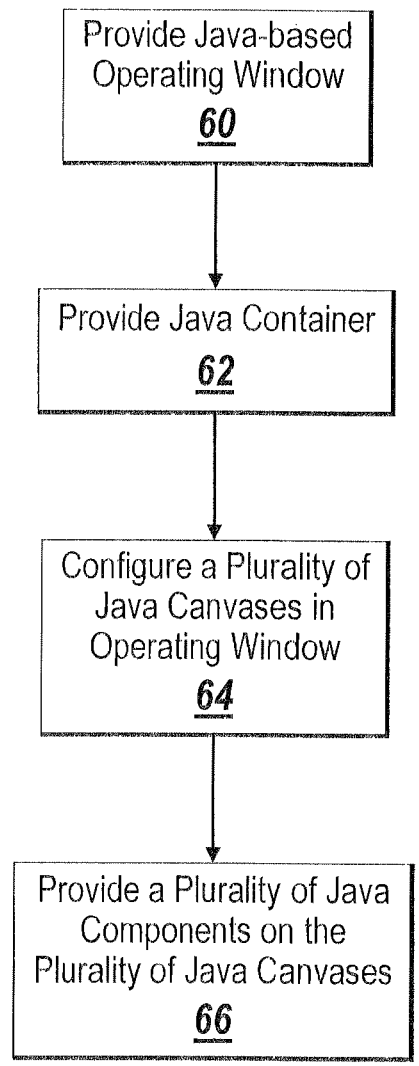
FIG. 5 is a flowchart illustrating a method of forming an operating system window with both Java based controls and non-Java based controls, according to one aspect of the present invention.
Figure 6:
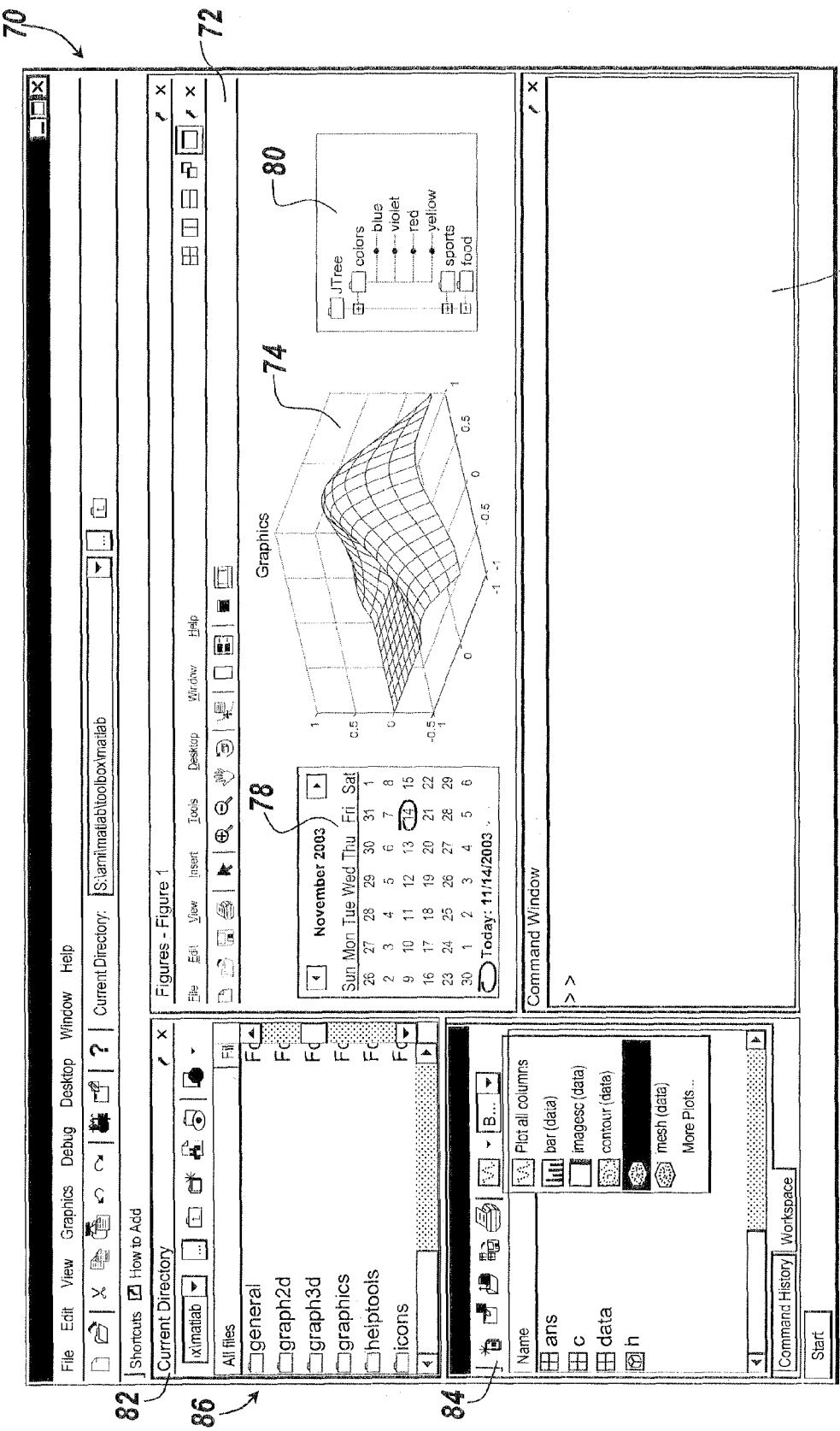
FIG. 6 is another screen depiction of an operating system window having an ActiveX control and a Java component, according to one aspect of the present invention.

FIG. 1 is a diagrammatic illustration of an example electronic device that can be utilized in practicing the present invention. FIGS. 2 and 3 illustrate conventional operating system window configurations or interfaces. The figures are utilized to present existing display formats. FIGS. 4, 5, and 6 wherein like parts are designated by like reference numerals throughout, illustrate example embodiments of operating system windows dynamically supporting ActiveX controls and Java components contemporaneously, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

The present invention can be implemented on an electronic device. FIG. 1 illustrates one example embodiment of an electronic device 100 suitable for practicing the illustrative embodiments of the present invention. The electronic device 100 is representative of a number of different technologies, such as personal computers (PCs), laptop computers, workstations, personal digital assistants (PDAs), Internet appliances, cellular telephones, wireless devices, and the like. In the illustrated embodiment, the electronic device 100 includes a central processing unit (CPU) 102 and a display device 104. The display device 104 enables the electronic device 100 to communicate directly with a user through a visual display. The electronic device 100 further includes a keyboard 106 and a mouse 108. Other potential input devices not depicted include a stylus, trackball, joystick, touch pad, touch screen, and the like. The electronic device 100 includes primary storage device 110 and secondary storage device 112 for storing data and instructions. The primary and secondary storage devices 110 and 112 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 110 and 112. The electronic device 100 can also include a network interface 114 for communicating with one or more electronic devices external to the electronic device 100 depicted. Modems and Ethernet cards, are examples of network interfaces 114 for establishing a connection with an external electronic device or network. The CPU 102 has either internally, or externally, attached thereto one or more of the aforementioned components. Interactive programming and/or development applications 116, such as MATLAB, Simulink®, or Labview® can be installed and operated on the electronic device 100.

It should be noted that the electronic device 100 is merely representative of a structure for implementing the present invention. However, one of ordinary skill in the art will appreciate that the present invention is not limited to implementation on only the described electronic device 100. Other implementations can be utilized, including an implementation based partially or entirely in embedded code, where no user inputs or display devices are necessary. In such an instance, a processor can communicate directly with another processor, or other device.

It should further be noted that the following description makes use of MATLAB as a representative modeling application that can make use of the present invention. However, the present invention is by no means limited to use with MATLAB, or even interactive programming applications. The present invention, and its equivalents as understood by those of ordinary skill in the art, can be utilized in conjunction with interactive applications, compilers, and other code-generating mechanisms.

FIG. 2 is a screen depiction of an operating system window or figure window 20 as is conventional in the art. The figure window 20 is provided by the operating system, such as a form of Windows® as provided by the Microsoft Corporation of Redmond, Wash. The conventional figure window 20 includes a tool bar or menu bar 22 that contains numerous buttons and/or pull-down menus for interactive use. The figure window 20 shown further includes a graphical representation 24 that comprises a substantial portion of the figure window 20. The graphical representation 24 is one of many different forms of content that can be found in a figure window, such as graphics, text, command prompts, and the like, as is understood by one of ordinary skill in the art. The figure window 20 further includes an interface control 26. The interface control 26 represents a button, slide, dial, entry field, or other interface that can be provided to the user to interface with the software application operating in the figure window 20. The interface control 26 provides the mechanism by which the user can manipulate or otherwise provide instruction or input to the electronic device running the software application that creates the interactive environment.

FIG. 3 is a screen depiction of a figure window 30 as is conventional in the art. The figure window 30 is provided by the operating system. The conventional figure window 30 includes a tool bar or menu bar 32 that contains numerous buttons and/or pull-down menus for interactive use. The figure window 30 shown further includes a graphical representation 34. The figure window 30 further includes an interface control 36. All of the named elements of the figure window 30 described thus far are the same as those found in the previously described figure window 20. In addition, the figure window 30 of FIG. 3 includes an ActiveX control 38.

An ActiveX or .NET control can be automatically downloaded and executed by a Web browser. ActiveX and .NET controls can be written in a variety of languages, including C, C++, Visual Basic, and Java. An ActiveX or .NET control is similar to a Java applet. Unlike Java applets, however, ActiveX and .NET controls have full access to the Windows operating system. Microsoft has developed a registration system so that browsers can identify and authenticate an ActiveX or .NET control before downloading it. In addition, Java applets can be written to run on all platforms, but ActiveX and .NET controls are currently limited to operation only in Windows environments.

In the example embodiment illustrated, the ActiveX control 38 is in the form of a calendar. One of ordinary skill in the art will appreciate that the specific form of ActiveX and/or .NET control can vary, and can include any number of different functions or operations. Some example ActiveX and .NET controls 38 include, but are not limited to, a calendar, a clock, an alarm, a system monitor, a calculator, an updating display, table, tab panel, tree, slider, knob, switch, speedometer, and the like.

Conventionally, the figure window 30 containing the ActiveX control 38, as shown in FIG. 3, is an operating system based window. More specifically, in the case of ActiveX or .NET, the figure window 30 is a Windows® based figure window. Contrarily, the figure window 20 of FIG. 2 can be an operating system based window, or, for example, a Java based window (an operating system window with a Java container), because it does not include an ActiveX control, .NET control, or other similar Windows® based control. The present invention, as further detailed herein, makes use of a Java based window, but can ultimately support the ActiveX control 38 despite not being a Windows® based window. In addition, it should be noted that the ActiveX control 38 is referred to herein in the example embodiments. However, the present invention is not limited to only use with ActiveX controls. Other controls, such as .NET controls, can be utilized in accordance with the present invention. Therefore, references in the following description to ActiveX controls are intended to include other controls, such as .NET, within the scope of the invention.

FIG. 4 is a screen depiction of a figure window 40 in accordance with one example embodiment of the present invention. The figure window 40 includes a tool bar or menu bar 42 that contains numerous buttons and/or pull-down menus for interactive use. The figure window 40 shown further includes a graphical representation 44. The graphical representation 44 is user definable and modifiable while the figure window 40 is operating.

The figure window 40 further includes an interface control 46. All of the named elements of the figure window 40 described thus far are the same as those found in the previously described figure windows 20 and 30. In addition, as with the figure window 30 of FIG. 3, an ActiveX control 48 is provided. Furthermore, the figure window 40 of the present invention can support a Java component 50. The Java component 50 is illustrated as a file directory tree. However, one of ordinary skill in the art will appreciate that the Java component 50 can take a number of different forms, and have different functions or operations, and thus is not limited to the specific embodiment illustrated.

In operation, the figure window 40 of the present invention thus supports the graphical representation 44, the interface control 46, the ActiveX control 48, and the Java component 50. Accordingly, when the figure window 40 is originated by the operating system, a characterization is required in the instruction to create the figure window 40 having at least one Java container associated therewith. Interactive programming and development environments, such as MATLAB, can provide an API for creating Java and other components, and a bridge for hosting them in the figure window.

If a user wishes to switch one or more of the above elements supported by the figure window, the user merely clicks and drags or otherwise manipulates the element, and can replace the element with another element of same, similar, or different function. More specifically, the user can identify the ActiveX control 48, remove the ActiveX control, and replace the ActiveX control 48 with a different ActiveX control. Thus, all of the elements shown in the figure window 40 are interchangeable and dynamically configurable, removable, and replaceable.

To enable the figure window 40 of the present invention as described, the underlying structure must be configured in a different manner from the conventional figure window approach. In the conventional figure window supporting an ActiveX control (e.g., figure window 30), the figure window is a Windows® based operating system window.

However, the present invention provides the figure window 40 in the form of an operating system window having a UI container associated therewith. More specifically, in the example embodiment described herein, a Java based window is provided which as mentioned above is essentially an operating system window having a Java container to support Java components.

MATLAB enables the user to create the figure window 40 and provides a bridge for hosting components in the figure window. The creation of the figure window 40 begins with a frame being defined for the figure window 40. A UI container object is defined for the figure window 40, for example a Java container, and the UI contained object contains a canvas for each ActiveX control and other UI controls. Environments such as MATLAB provide a bridge to enable this functionality. More specifically, for each control desired for display in the Java based figure window 40, a Java canvas is provided as the foundation that supports the element.

To enable a seamless operation, the Java based figure window 40 can be created and a Java canvas created to fit substantially within the full size of the figure window 40. A Java canvas can then be created, sized, and dimensioned, to support each of the controls desired to be placed in the figure window 40. Thus, in the instance of the example embodiment shown in FIG. 4, an additional Java canvas is created and placed in the figure window 40 for the ActiveX control 48. In such an arrangement, resizing of the figure window 40 and initial Java canvas will result in the automated resizing of each of the control supported by Java canvases.

Each of the elements or components can be a Java component, an ActiveX or .NET control, or some other form of component that can reside and be supported by a Java canvas, as is understood by one of ordinary skill in the art. Accordingly, the present invention provides a mechanism for both Java based components (i.e., components having a Java class or Java interface) with non-Java based components, such as the ActiveX control 48, to exist, operate, and be dynamically updated, configured, and replaced, in a single FIGURE window.

FIG. 5 is a flowchart showing a method of providing the system described herein to dynamically host a plurality of components in a Java-based operating system window. First, a Java-based window is provided (step 60). A Java container is placed in the Java-based operating system window (step 62). A plurality of Java canvases are configured in the Java-based operating system window, such that each Java canvas is supported by the Java container (step 64). The plurality of components that are controls are positioned on the plurality of Java canvases (step 66). At least one of the components can be based on a format other than Java (i.e., the component does not contain a Java class or a Java interface). Thus, one or more components can be, for example, a Java control. Other of the components can be, for example, an ActiveX, .NET, or other non-Java based control. The components can be graphical representations, Java controls, or other interfaces or displays. The control components are supported by individual Java canvases placed within the figure window. Each of the components can be updated or modified through the click system of the Windows® operating system, as is understood by one of ordinary skill in the art.

If desired, one or more of the components can be removed, and new components can be added without requiring the figure window to be re-created. The addition and removal of components supported by Java canvases with regard to a Java based figure window such as the figure window 40 is known in the art, and thus the underlying software mechanism for the addition and removal will not be further discussed. One of the previously unknown features of the present invention is the combination of non-Java based components and Java based components operating on the same Java based figure window, as described herein. However, the basic interoperation of components in itself has not been modified, and thus does not require further explanation.

It should be noted that the embodiment described herein is merely illustrative of one possible implementation of the present invention. The present invention can be implemented in a number of different configurations. For example, a Java frame can be created in a Windows® environment. Using primarily native Java methods, a Windows® API call can be created to get the hWnd (high level window) figure window from the Java canvas. The native hWnd figure window can then serve as the parent for the ActiveX, .NET, or other, control.

Alternatively, a Java frame can be created (i.e., java.awt.Frame) in the Windows® environment. A Java canvas can then be created in the frame (i.e., java.awt.Canvas). Using native Java paint methods on the Java canvas, a user can get the hWnd figure window from the Java canvas. The native hWnd figure window is then utilized as a parent for the ActiveX or .NET control.

Building on the above alternative, and using conventional Java methods, the ActiveX or .NET control is created invisible. In the addNotify and removeNotify methods for the Java canvas, native Java methods are utilized to show and hide the ActiveX control. In the removeNotify method, the ActiveX control parent is set to NULL. In the addNotify method, the ActiveX control parent is set to the new hWnd figure window. This enables the user to change the window behind the Java container without losing the ActiveX, .NET, or other, control.

FIG. 6 is a screen depiction of a figure window 70 in accordance with one example embodiment of the present invention. The figure window 70 includes a tool bar or menu bar 72 that contains numerous buttons and/or pull-down menus for interactive use. The figure window 70 further includes a graphical representation 74. The figure window 70 further includes an interface control 76. In addition, as with the figure window 30 of FIG. 3, an ActiveX control 78 is provided. Furthermore, the figure window 70 of the present invention can support a Java component 80. In addition, the present invention is shown in a larger user interface display that includes a current directory window 82 and a workspace window 84. Each of the figure window 70, the current directory window 82, and the workspace window 84 have their own Java containers. As such, FIG. 6 shows the present invention expanded to include multiple Java based operating system windows functioning contemporaneously and in the same overall display to provide an interactive programming and/or development environment 86.

The present invention thus provides a system and method for use on an electronic device. The system and method provide a dynamic hosting of one or more components in a Java-based operating system window. The Java-based window is provided with a Java container. One or more Java canvases can be configured in the Java-based operating system window, supported by the Java container. The plurality of components that are controls are placed on the plurality of Java canvases. Each of the controls can be dynamically added and removed from the plurality of Java canvases without recreation of the Java-based operating system window. In addition, not all of the components need be Java originated. Instead, the components can be non-Java in origination, such as ActiveX or some other format that can exist on a Java canvas.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure and interoperability may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A method comprising:
   obtaining, using a processor of an electronic device, a handle for a first graphical window, the first graphical window being based on an object-oriented programming language, the handle being obtained using methods native to the object-oriented programming language;
   generating a component object model (COM) component as an invisible component, the generating comprising:
      using a parent window handle for the COM component set to NULL; and
   replacing the parent window handle for the COM component with the obtained handle, the replacing comprising:
      causing the COM component to be hosted and displayed in the first graphical window
   where:
      the COM component is hosted by an operating system window, and
      the replacing is performed using the processor.

2. The method of claim 1, wherein the first graphical window is a canvas supported by the object-oriented programming language.

3. The method of claim 1, further comprising:
   obtaining, using the processor, a handle for a second graphical window, the second graphical window being based on the object-oriented programming language; and
   replacing, using the processor, a parent window handle for the first graphical window with the obtained handle for the second graphical window to cause the first graphical window to be hosted by the second graphical window.

4. The method of claim 3, wherein the handle for the second window is obtained using one or more methods native to the object-oriented programming language.

5. The method of claim 1, further comprising:
   compiling, using the processor, the object-oriented programming language to an intermediate form that is executable by a virtual machine under control of an operating system.

6. The method of claim 1, further comprising:
   replacing, using the processor, a parent window handle for a second component with the obtained handle to cause the second component to be hosted by the first graphical window.

7. The method of claim 6, wherein the second component is hosted by a second operating system window.

8. One or more non-transitory computer-readable media holding one or more computer-executable instructions that, when executed by one or more processors, cause the one or more processors to:
   obtain a handle for a first graphical window, the first graphical window being based on an object-oriented programming language, the handle being obtained using methods native to the object-oriented programming language;
   generate a component object model (COM) component as an invisible component, the generating comprising:
      using a parent window handle for the COM component set to NULL; and
   replace the parent window handle for the COM component with the obtained handle, the replacing comprising:
      causing the COM component to be hosted and displayed in the first graphical window
   where:
      the COM component is hosted by an operating system window, and
      the replacing is performed using the processor.

9. The media of claim 8, wherein the first graphical window is a canvas supported by the object-oriented programming language.

10. The media of claim 8, further holding one or more computer-executable instructions that, when executed by one or more processors, cause the one or more processors to:
    obtain a handle for a second graphical window, the second graphical window being based on the object-oriented programming language; and
    replace a parent window handle for the first graphical window with the obtained handle for the second graphical window to cause the first graphical window to be hosted by the second graphical window.

11. The media of claim 10, wherein the handle for the second graphical window is obtained using one or more methods native to the object-oriented programming language.

12. The media of claim 8, wherein the object-oriented programming language is compiled to an intermediate form that is executable by a virtual machine under control of an operating system.

13. The media of claim 8, further holding one or more computer-executable instructions that, when executed by one or more processors, cause the one or more processors to:
    replace a parent window handle for a second component with the obtained handle to cause the second component to be hosted by the first graphical window.

14. The media of claim 13, wherein the second component is hosted by a second operating system window.

15. A system comprising:
an electronic device comprising one or more processors to:
obtain a handle for a first graphical window, the first graphical window being based on an object-oriented programming language, the handle being obtained using methods native to the object-oriented programming language,
generate a component object model (COM) component as an invisible component at least in part by:
using a parent window handle for the COM component set to NULL; and
replace the parent window handle for the COM component with the obtained handle at least in part by:
causing the COM component to be hosted and displayed in the first graphical window
where:
the COM component is hosted by an operating system window, and
the replacing is performed using the processor.

\* \* \* \* \*